United States Patent
Ducloux et al.

(10) Patent No.: US 7,991,048 B2
(45) Date of Patent: Aug. 2, 2011

(54) DEVICE AND METHOD FOR DOUBLE-PASS ENCODING OF A VIDEO DATA STREAM

(75) Inventors: Xavier Ducloux, Rennes (FR); Alain Sorin, Cesson Sevigne (FR); Thierry Lorand, Liffre (FR)

(73) Assignee: Thomson Licensing, Boulogne-Billancourt (FR)

( * ) Notice: Subject to any disclaimer, the term of this patent is extended or adjusted under 35 U.S.C. 154(b) by 1458 days.

(21) Appl. No.: 10/544,522

(22) PCT Filed: Feb. 4, 2004

(86) PCT No.: PCT/EP2004/050078
§ 371 (c)(1),
(2), (4) Date: Jun. 5, 2006

(87) PCT Pub. No.: WO2004/070950
PCT Pub. Date: Aug. 19, 2004

(65) Prior Publication Data
US 2006/0274832 A1 Dec. 7, 2006

(30) Foreign Application Priority Data
Feb. 10, 2003 (FR) .................................. 03 01523

(51) Int. Cl.
*H04B 1/66* (2006.01)
*H04N 7/12* (2006.01)
*H04N 11/02* (2006.01)
*H04N 11/04* (2006.01)
*G06K 9/36* (2006.01)
*G06K 9/00* (2006.01)

(52) U.S. Cl. ......... 375/240.15; 375/240.12; 375/240.03; 375/240.1; 382/232; 382/251

(58) Field of Classification Search ............. 375/240.16, 375/240.03, 240.12
See application file for complete search history.

(56) References Cited

U.S. PATENT DOCUMENTS

| 5,287,420 A | | 2/1994 | Barrett |
| 5,757,434 A | * | 5/1998 | Gunnewiek et al. ..... 375/240.03 |
| 5,805,224 A | * | 9/1998 | Keesman et al. ........ 375/240.04 |
| 5,978,029 A | * | 11/1999 | Boice et al. ............. 375/240.14 |

(Continued)

FOREIGN PATENT DOCUMENTS

EP 0655868 A1 * 11/1994

(Continued)

OTHER PUBLICATIONS

M. Pereira et al.: "Re-codable video", Proceedings of the International Conference on Image Processing (ICIP), Austin, Nov. 13-16, 1994, vol. 3, Conf. 1, Nov. 13, 1994, pp. 952-956.

(Continued)

*Primary Examiner* — Jayanti K Patel
*Assistant Examiner* — Jessica Prince
(74) *Attorney, Agent, or Firm* — Robert D. Shedd; Paul P. Kiel; Guy H. Eriksen

(57) ABSTRACT

The invention relates to a device for double pass encoding of a video data stream comprising:
  a first type encoding means performing the first encoding pass,
  a second type encoding means performing the second encoding pass.
According to the invention,
  the second type encoding means are different from the first type encoding means and
  the second type encoding means use encoding information originating from the first encoding pass.
Application to MPEG-2 and H.264 encoding.

9 Claims, 3 Drawing Sheets

U.S. PATENT DOCUMENTS

Figure 1:
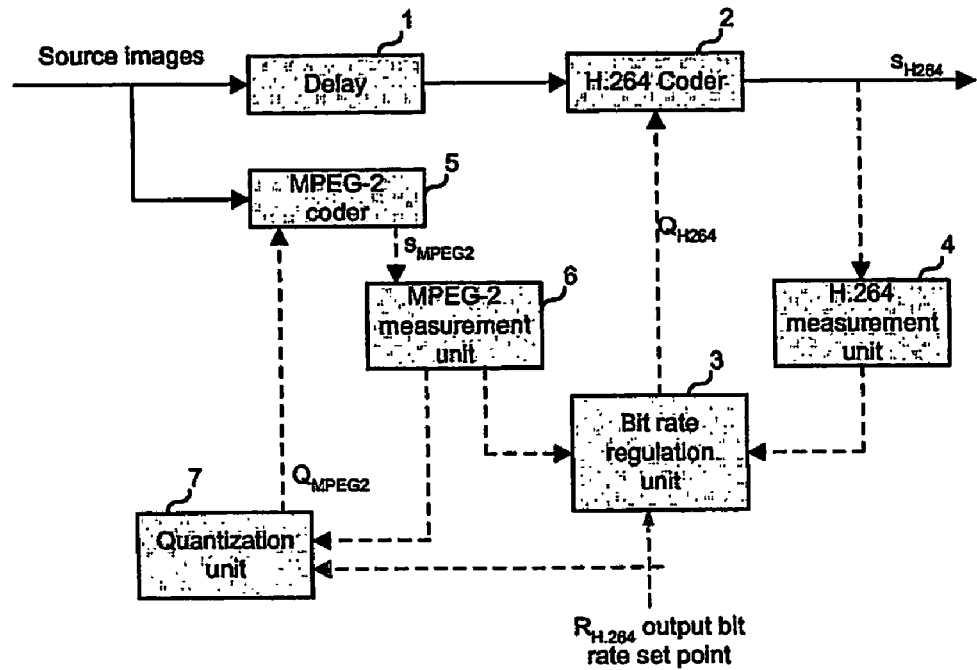

| | | | |
|---|---|---|---|
| 6,381,274 B1 | 4/2002 | Sugahara | |
| 6,466,621 B1 * | 10/2002 | Cougnard et al. | 375/240.1 |
| 6,501,800 B1 | 12/2002 | Sawada | |
| 6,961,376 B2 * | 11/2005 | Wu et al. | 375/240.12 |
| 7,099,389 B1 * | 8/2006 | Yu et al. | 375/240.12 |
| 2002/0044603 A1 | 4/2002 | Rajagopalan et al. | |
| 2003/0039310 A1 * | 2/2003 | Wu et al. | 375/240.16 |
| 2003/0174771 A1 * | 9/2003 | Sugahara et al. | 375/240.03 |
| 2003/0235220 A1 * | 12/2003 | Wu et al. | 370/535 |
| 2003/0235247 A1 * | 12/2003 | Wu et al. | 375/240.03 |
| 2004/0233998 A1 * | 11/2004 | Wu et al. | 375/240.29 |

FOREIGN PATENT DOCUMENTS

| | | |
|---|---|---|
| EP | 0655868 | 5/1995 |
| EP | 0924933 | 6/1999 |
| JP | 07-203463 | 8/1995 |
| JP | 10-304376 | 11/1998 |
| JP | 11-275577 | 10/1999 |
| JP | 2000-228770 | 8/2000 |
| JP | 2001-086512 | 3/2001 |

OTHER PUBLICATIONS

"Text of Committee Draft of Joint Video Specification (ITU-T Rec. H-264 ISO/IEC 14496-10 AVC", Int'l Standard ISO/IEC, May 2002, pp. I-X, 1-133.

Search Report Dated Jun. 15, 2004.

* cited by examiner

DEVICE AND METHOD FOR DOUBLE-PASS ENCODING OF A VIDEO DATA STREAM

This application claims the benefit, under 35 U.S.C. §365 of International Application PCT/EP04/050078, filed Feb. 4, 2004, which was published in accordance with PCT Article 21(2) on Aug. 19, 2004 in English and which claims the benefit of French patent application No. 0301523, filed Feb. 10, 2003.

The invention relates to a device for and a method of double pass encoding of a video data stream.

New standards of compression are emerging and generating increased encoding costs and complexities while considerably improving the quality of encoding. The development of multimedia applications and the multiplicity of data networks are making data encoding systems increasingly complex.

In a context of source images, numerous double pass encoding techniques have been developed, the first encoding pass providing a precise knowledge of the complexities of the images to be encoded, the second pass then encoding the images based on this complexity.

Such double pass encoding techniques are extremely powerful but costly particularly in the case of an encoder complying with the H26L standard (also Identified as H.264) defined in the ITU-T Standard Recommendation H.264|ISO/IEC 14496-10 AVC.

The Invention proposes a device for double pass encoding of a video data stream comprising:
  a first type encoding means performing the first encoding pass,
  a second type encoding means performing the second encoding pass.
  According to the invention
  the second type encoding means are different from the first type encoding means and
  the second type encoding means use encoding information originating from the first encoding pass.

Thus, instead of using two encoding passes performing encoding of the same type or a single pass coder, a double pass coder is used in which the two encoding passes apply different types of encoding. The possibility of using two encoding passes of different types may when necessary enable an implementation cost saving while preserving the encoding quality offered by a double-pass encoder and while improving the complexity prediction quality as compared with single pass encoding.

According to a preferred embodiment,
  the first type encoding means comprise:
    means of measuring the encoding costs of the first pass for each image of the video stream to be encoded,
    means of memorizing the encoding costs of the first encoding pass of several images defining a reference period,
  the second type encoding means comprise:
    means of measuring the encoding costs of the second pass for each image of the video stream to be encoded,
    means of memorizing the encoding costs of the second encoding pass of several images defining a reference period.

The first encoding pass provides a precise knowledge of the complexities of encoding the images and of the reference period. The use of a reference period guarantees the stability of the second encoding pass.

According to a preferred embodiment, the device comprises means of regulating the bit rate of the data stream originating from the second pass encoding means.

According to a preferred embodiment, the means of regulating the bit rate comprise:
  prediction means which compute the relative weight of the image to be encoded in the reference period,
  regulation means which compute a target cost of the image to be encoded by the second type encoding means on the basis of
    a target bit rate received from the second type encoding means and
    the relative weight of the image to be encoded in the reference period,
  means of quantizing second type encoding which compute the quantization step to be applied to each image to be encoded by the second type encoding means on the basis of the target cost of the image.

According to a preferred embodiment,
  the encoding costs of the first pass and of the second pass comprise at least for each image to be encoded and for each reference period:
    the reducible cost,
    the non-reducible cost,
  and the encoding means of the first pass and of the second pass compute for each image to be encoded the complexity of encoding as being the product of the reducible cost times the quantization step.

According to a preferred embodiment, the means of prediction comprise:
  means of computing a ratio, known as non-reducible cost ratio, of the non-reducible encoding cost of the first pass over the non-reducible encoding cost of the second pass for each image to be encoded,
  means of computing a ratio, called complexity ratio, of the complexity of first pass encoding over the complexity of second pass encoding for each image to be encoded,
  means of updating a complexity ratio averaged on the basis of the complexity ratio of the last images encoded and
  means of updating a non-reducible cost averaged on the basis of the non-reducible cost ratio of the last images encoded,
  means of estimating the complexity of the current image to be encoded by the second type encoding means on the basis of the averaged complexity ratio and of the complexity of second type encoding of the said image,
  means of estimating the non-reducible cost of the current image to be encoded by the second type encoding means on the basis of the ratio of averaged non-reducible cost and the non-reducible cost of first type encoding of the said image,
  means of computing the non-reducible cost of the reference period to which the current image belongs,
  means of computing the complexity of the reference period to which the current image belongs,
  means of computing the relative weight of the current image as being the ratio between the complexity of the current image and the total complexity of the reference period to which the current image belongs.

According to a preferred embodiment, the mean bit rate of the data stream originating from the first pass encoding means is from 30 percent to 50 percent greater than the target bit rate received from the second pass encoding means.

According to a preferred embodiment, the encoding device comprises means of quantization of first pass encoding computing a quantization step on the basis of the target bit rate received from the second pass encoding means.

According to a preferred embodiment, the first pass encoding means encode the image in accordance with the MPEG-2 standard and the second pass encoding means encode the image in accordance with the H.264 standard.

The study of the reducible costs and the syntax costs from image to image on an H.264 encoding diagram shows that, as in MPEG-2:
  the reducible costs from one intra (I) or predictive (P) image to the other may be extremely unstable,
  the syntax costs from one P or bidirectional (B) image to the other are often extremely unstable.

Consequently, complexity predictions based on the most recently encoded images of the same type cannot be considered reliable.

On the other hand, the study of the ratios of reducible costs and syntax costs from image to image in MPEG-2 and in H.264 shows that these ratios exhibit a reasonably noticeable stability for each of the image types. Therefore, the Idea of adding a first MPEG-2 encoding pass to an H.264 encoding to improve the quality of prediction of the complexities makes perfect sense.

The principle used is to link two image complexity measurement units, one on the first MPEG-2 encoding pass, the other on the second H.264 encoding pass. The depth of measurement between the two encoding passes must be a GOP to enable optimal relative predictions.

The combination of a first MPEG-2 type encoding pass with a second H.264 type encoding pass reduces the implementation costs of a double pass encoder complying with the H.264 standard while coming near to the performance of such a coder.

The invention also relates to a method of double pass encoding of a video data stream comprising the steps of,
  encoding according to a first type performing the first encoding pass,
  encoding according to a second type performing the second encoding pass.
  According to the invention,
  the second type encoding is different from the first type encoding and
  the second type encoding step uses encoding information originating from the first encoding pass.

The invention also relates to a computer program product, characterized in that it comprises program code instructions for the execution of the steps of the method according to the invention when the said program is executed on a computer. A "computer program product" means a computer program medium, which consist not only consists of a storage space containing the program, such as a diskette or a cassette.

Figure 2:
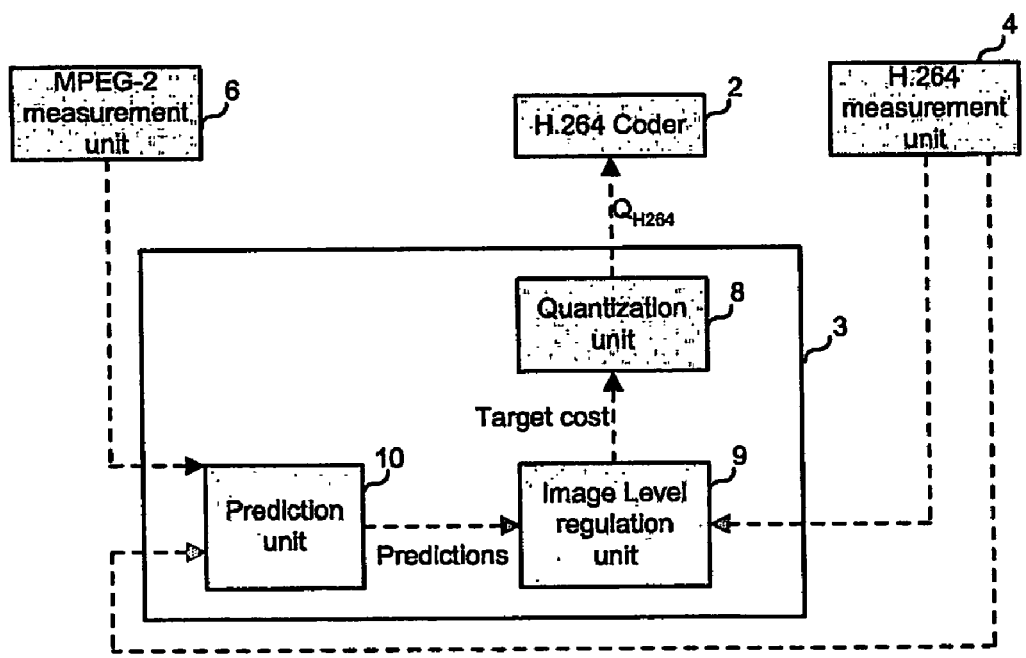
Figure 3:
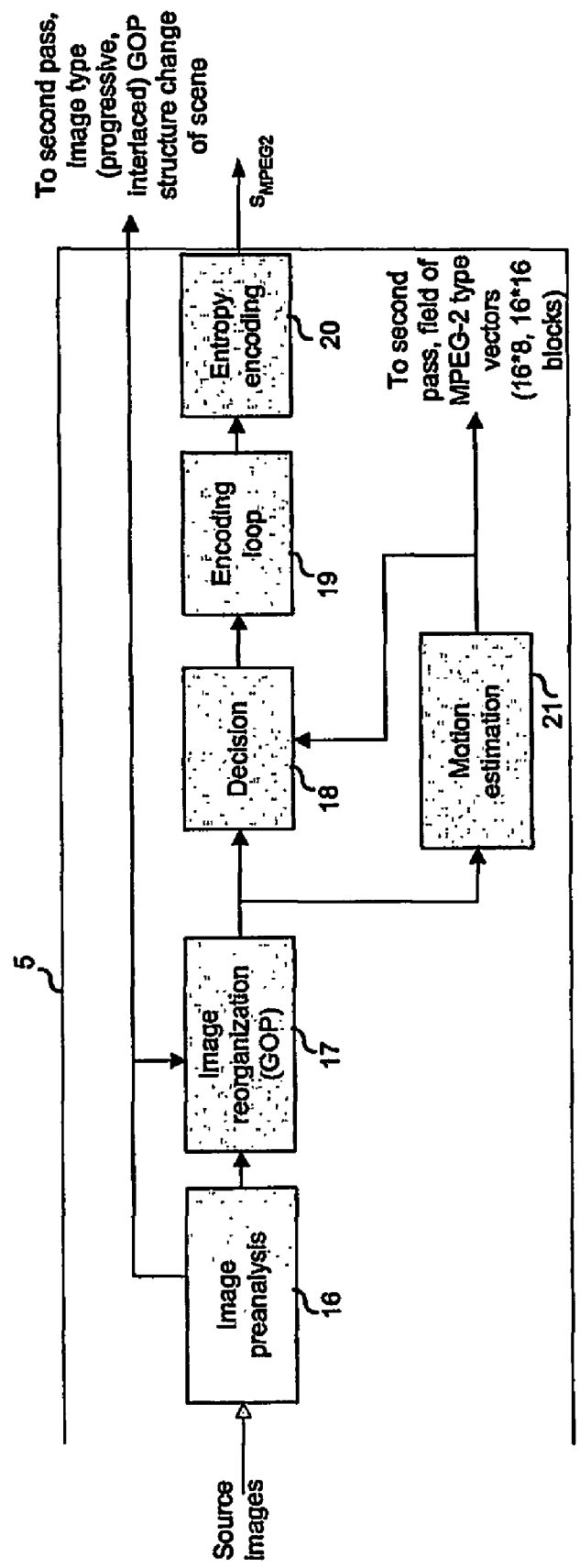
Figure 4:
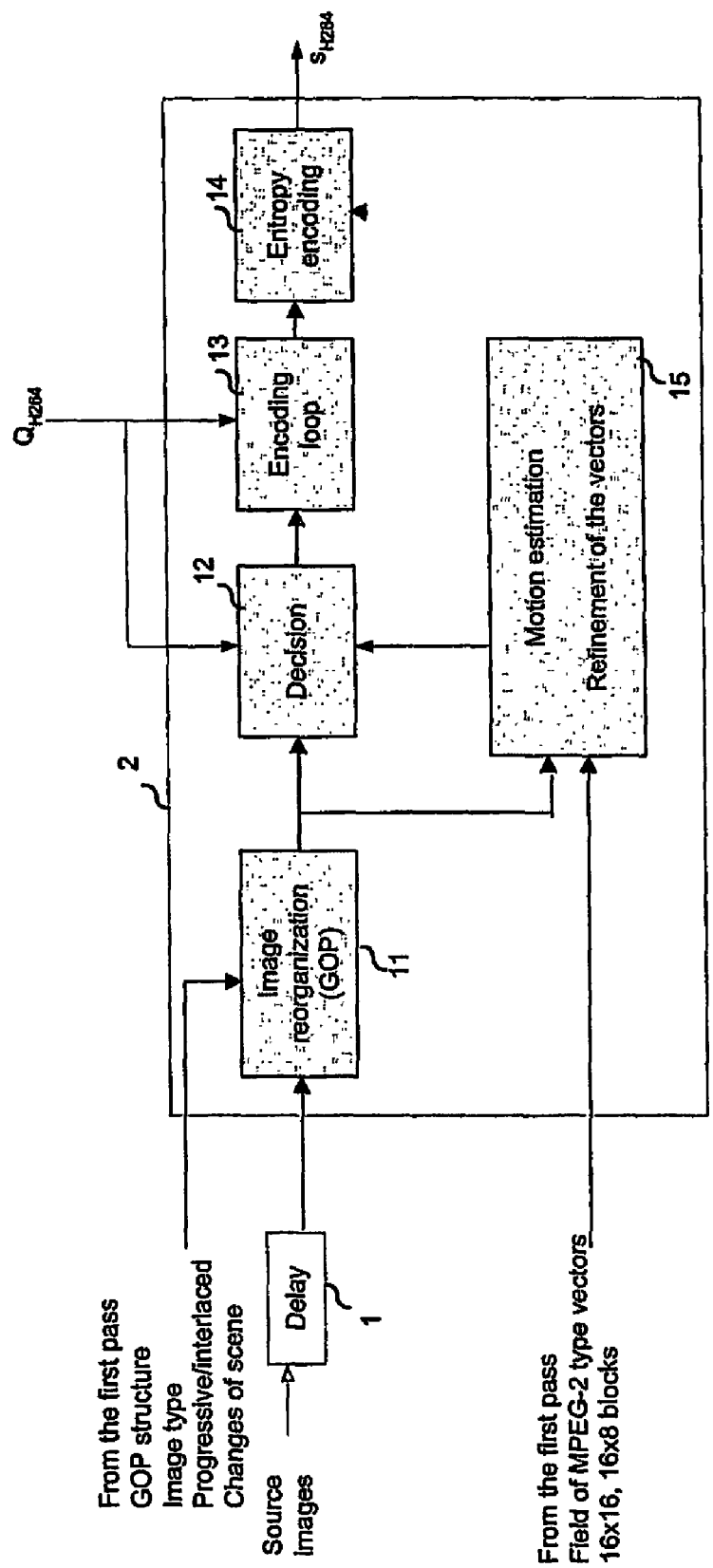

The invention will be better understood and Illustrated by means of non-limiting exemplary embodiments and advantageous implementations with reference to the appended figures wherein:

FIG. 1 represents an encoding device according to an embodiment of the invention, FIG. 2 represents a bit rate regulation module according to an embodiment of the invention, FIG. 3 represents an MPEG-2 encoding device as used in FIG. 1, FIG. 4 represents an H.264 encoding device as used in FIG. 1.

The encoding device comprises first pass encoding means 5. According to a preferred embodiment, these encoding means perform encoding according to the MPEG-2 standard.

These encoding means 5 are linked to an MPEG-2 measurement means 6.

The encoding device also comprises means 1 generating a delay in the video data stream incoming from second pass encoding means 2.

According to a preferred embodiment described below, the second pass encoding means 2 perform encoding according to the H.264 standard.

The output of the second pass encoding means 2 is linked to the input of second pass encoding information measurement means 4.

The output of the H.264 measurement means 4 is linked to an input of a bit rate regulation unit 3.

This bit rate regulation unit 3 also receives at the input an output target bit rate signal as well as measurement signals originating from the MPEG-2 measurement means 6. The measurement signals originating from the means 6 are also transmitted to an input of a quantization means 7. This quantization means 7 also receives at the input the output target bit rate signal. This quantzation means 7 performs the pseudo-regulation of the bit rate at the output of the first pass encoding means 5 and transmits a $Q_{MPEG-2}$ quantization step to the first pass encoding means 5.

The encoding means 5 performs encoding in open loop, the stream generated by this encoding means not complying with any precise target bit rate per image.

According to a preferred embodiment, the quantization step used by the first pass encoding means 5 is corrected on the basis of the target bit rate fixed for the second pass encoding means 2.

Advantageously, the average bit rate at the output of the first pass encoding means 5 is 30% to 50% greater than the target bit rate fixed for the H.264 encoding means 4 to obtain optimal operation of the coder.

The bit rate regulation unit 3 is represented in FIG. 2. It can be broken down into:
  an encoding complexity and cost prediction unit 10,
  an image level regulation unit 9, taking into account the state of a virtual decoder buffer,
  a quantization unit 8.

The video data stream is received at the input of the encoding means 5 performing the first encoding pass.

In the case of MPEG-2 or MPEG-4 ASP encoding, the reducible cost is due mainly to the coefficients of the discrete cosine transform DCT. In the case of H.264 encoding, the reducible cost is due to the complete transform approximating a DCT transform.

In the preferred embodiment described here, wherein the first encoding pass is performed by encoding means complying with the MPEG-2 standard, the images can be encoded in three modes, intra (I), bidirectional (B) or predictive (P).

In the case of MPEG-2 type encoding, the quantization granularity is sometimes finer than an image type granularity and may be at macroblock level. In this case, each macroblock of the image is encoded with its own quantization step.

The encoding means 5 performs encoding complying with the MPEG-2 standard. It supplies to the means 6 the following parameters for each macroblock of the image:
  The reducible cost, denoted $EncCost_{MPEG2}$.
  The non-reducible cost also called syntax cost, denoted $Overhead_{MPEG2}$.

For each macroblock of the images of the video stream, the means 6 computes:
  the complexity, expressed as the product of the reducible cost times the quantization step, denoted $X_{MPEG2}$.

Then, to compute the reducible cost and the complexity of each image, it sums up respectively the reducible costs and complexities of each macroblock.

To ensure the quality of encoding of the images over time, the encoding is regulated over time, over a reference period.

In MPEG-2 or H.264 type encodings, the GOP ("Group Of Pictures") constitutes an appropriate reference period.

The means 6 therefore also computes by summing up over the reference period:
  the non-reducible costs of the whole set of images, by image type, over the reference period, denoted IGOPOverhead$_{MPEG2}$, BGOPOverhead$_{MPEG2}$, PGOPOverhead$_{MPEG2}$, respectively for the I, B and P images,
  the complexity of the whole set of images, by image type for the reference period, denoted IGOPX$_{MPEG2}$, BGOPX$_{MPEG2}$, PGOPX$_{MPEG2}$,
  the total cost, including the reducible cost and the non-reducible cost, of the whole set of images for the reference period, by image type.

The second pass encoding means 2 performs encoding complying with the H.264 standard. It supplies to the measurement means 4 the following parameters for each macroblock of the image:
  The reducible cost denoted EncCost$_{H264}$.
  The quantization step.

The measurement means 4 computes the X$_{H264}$ macroblock complexity by calculating the product of the reducible cost times the quantization step.

For each macroblock, the measurement means 4 computes the sum total of the reducible costs and of the complexity. From this it deduces the non-reducible cost, denoted Overhead$_{H264}$.

FIG. 2 represents the bit rate regulation unit 3.
The bit rate regulation unit 3 comprises:
  a unit 10 for predicting the relative costs and complexities of the current image to be encoded,
  an image level regulation unit 9,
  a quantization unit 8.

The unit 10 for predicting the relative costs and complexities of the current image to be encoded computes an estimate of the non-reducible cost and of the complexity, at the same time for the current image and for the reference period previously defined, in order to supply to the image level regulation unit 9 the relative weight of the image to be encoded.

The sequence of operations performed by the prediction unit 10 is as follows:
  computation of the ratio between the non-reducible cost of the encoding performed by the first pass encoding means 5 and the non-reducible cost of the encoding performed by the second pass encoding means 2 for the last encoded image:

$$Ratio_{overhead} = \frac{Overhead_{H.264}}{Overhead_{MPEG-2}}$$

computation of the ratio between the complexity of the encoding performed by the first pass encoding means 5 and the complexity of the encoding performed by the second pass encoding means 2 for the last encoded image:

$$Ratio_x = \frac{X_{H.264}}{X_{MPEG-2}}$$

The module 10 updates, based on the latest ratios thus stored, an averaged complexity ratio, SmoothedRatio$_x$, and an averaged non-reducible cost ratio, SmoothedRatio$_{overhead}$. The Ratio$_X$ and Ratio$_{overhead}$ ratios used are evaluated over a different period from the reference period. These ratios are computed for the different encoding modes, one ratio being computed for each encoding type.

For intra (I) type images:

Smoothedratio$_{Overhead}$=Ratio$_{Overhead}$

Smoothedratio$_x$=Ratio$_x$

For the bidirectional (B) or predictive (P) type images:

$$Smoothedratio_{Overhead} = \frac{2 \times SmoothedRatio_{Overhead} + Ratio_{Overhead}}{3}$$

$$Smoothedratio_x = \frac{2 \times SmoothedRatioX + Ratio_x}{3}$$

Smoothedratio$_{Overhead}$ and smoothedratio$_x$ being initialized respectively to the value Ratio$_{Overhead}$ and Ratio$_X$.

Then, the module 10 computes the non-reducible cost and the complexity of the current image to be encoded based on the measurements of the measurement unit 6.
  non-reducible cost of the current image to be encoded:

Overhead$_{H.264}$=SmoothedRatio$_{overhead}$[mode]×Overhead$_{MPEG-2}$ complexity of the current image to be encoded:

X$_{H.264}$=SmoothedRatio$_X$[mode]×X$_{MPEG-2}$

The module 10 also computes the non-reducible cost and the encoding complexity for the current reference period:
  non-reducible cost:

GOPOverhead$_{H.264}$=SmoothedRatio$_{Overhead}$[I]×IGOPOverhead$_{MPEG-2}$+SmoothedRatio$_{Overhead}$[B]×BGOPOverhead$_{MPEG-2}$+SmoothedRatio$_{Overhead}$[P]×BGOPOverhead$_{MPEG-2}$ complexity:

GOPX$_{H.264}$=Z$_I$×SmoothedRatio$_X$[I]×IGOPX$_{MPEG-2}$+Z$_P$×SmoothedRatio$_X$[P]×PGOPX$_{MPEG-2}$+Z$_B$×SmootedRatio$_X$[B]×BGOPX$_{MPEG-2}$ Z$_I$, Z$_P$ and Z$_B$ are weighting constants.

These constants convey the fact that to have an impression of constant encoding quality, the I, B and P images must be quantized differently, the B images being quantized more severely.

The regulation unit 9 at the image level computes an image target cost on the basis of the output target bit rate supplied by a monitoring unit (not represented) and of the relative weight of the image to be encoded in the reference period in question.

$$TargetCost = \frac{Z[mode]X_{H.264}}{GOPX_{H.264}} \times GOPTargetCost$$

where:

GOPTargetCost=(MeanBpp$_{H.264}$×Nbimages)−GOPOverhead$_{H.264}$

Where
TargetCost: image target cost,
GlobalTargetCost: global cost of the reference period,
MeanBpp$_{H.264}$: mean cost per image according to target bit rate,
Nbimages: number of images in the reference period.

The regulation unit where necessary corrects the preceding image target cost on the basis of the state of the virtual decoder buffer that it manages.

The quantization unit 8 computes the quantization to be applied in the image during the second pass encoding on the basis of the image target cost supplied by the image level regulation unit. The granularity of quantization may be image level or row of macroblocks or individual macroblocks level, at the option of the implementer.

FIGS. 3 and 4 implement a variant of a coder according to the invention. In FIGS. 3 and 4, the MPEG-2 coder supplies to the H.264 coder not only quantization information as illustrated in FIGS. 1 and 2 but also GOP, image type, change of scene and vector fields structure information. This enables a simplified H.264 encoding device to be used, without preanalysis and where necessary without motion estimation.

The coder 5 comprises an image preanalysis module 16. The module 16 is connected at the output to the input of a group of pictures (GOP) reorganization module 17. The output of the module 17 is connected to the input of a decision module 18 whose output is connected to the input of an encoding loop 19. The output of the encoding loop is connected to the input of an entropy encoding module 20.

The output of the module 17 is also connected to the input of a motion estimation module 21.

The modules 16, 17, 18, 19, 20 and 21 are part of the elements featured in a known manner in an MPEG-2 type coder.

In the embodiment in FIG. 3, the MPEG-2 type coder supplies, in addition to the quantization parameters as illustrated in FIG. 1, the following parameters (not shown in FIG. 1):
 the structure of the GOP,
 the image type (progressive, interlaced),
 the change of scene,
 MPEG-2 type vector fields.

FIG. 4 represents an embodiment of a single pass H.264 coder 2, used in a device according to the invention.

The coder 2 comprises an image reorganization module 11 which receives at the input the video images to be encoded that have been delayed in the module 1.

The output of the module 11 is linked to the input of a decision module 12 as well as to the input of a motion estimation module 15. The module 15 also receives at the input the signals originating from the coder 2 represented in FIG. 3, that is the MPEG-2 type vector fields for 16*8 or 16*16 blocks. The motion estimation module 15 modifies the precision of the vector fields to place them in conformity with the vector precision (half-pixel or quarter-pixel) of the standard of the second pass coder, that is H.264 in the preferred embodiment. In MPEG-2, the motion vectors have a half-pixel precision and in H.264, they have a quarter-pixel precision.

The motion estimation module 15 is also used to compute motion vectors that may be missing. In effect the H.264 standard authorizes 7 block sizes: 16*16, 16*8, 8*16, 8*8, 4*8, 8*4, 4*4 and the MPEG-2 standard authorizes only 2 block sizes, 16*16 and 16*8. Furthermore, in MPEG-2, the macroblocks may have one or two motion vectors depending on whether frame prediction (two vectors per macroblock, one vector per sub-block of 16*8 pixels) or image prediction (one vector associated with the 16*16 pixels block) is being used.

So the motion estimation module 15 may have to recompute missing vectors. This also depends on the complexity that is placed in the motion estimation module.

The module 12 receives at the input the information from the motion estimation module 15.

The output of the decision module 12 is linked to the input 13 of an encoding loop. It transmits to the encoding loop the choice made (encoding in inter/intra mode, the quantization step, etc.) according to the different possibilities offered by the standard.

The output of the encoding loop is linked to the input of an entropy encoding module 14. It transmits to the encoding loop the residuals (for example the coefficients after application of the quantization step) and the set of macroblock level information to be inserted in the macroblock header of the type. The entropy encoding module 14 supplies at the output the signal $S_{H264}$ to the measurement unit 4 represented in FIG. 1.

The image reorganization module 11 receives at the input the information originating from the first pass encoding, that is:
 the structure of the GOP,
 the image type (interlaced or progressive),
 the changes of scene.

The decision modules 2 and the encoding loop 13 also receive at the input the $Q_{H264}$ signal.

The modules 11, 12, 13, 14 and 15 are part of the elements featured in a known manner in an H.264 type coder.

The encoding performed by the coder 2 is thus optimized and its cost relative to an H.264 double pass coder is considerably reduced.

The double pass encoding device described above in the context of a first pass encoding according to the MPEG-2 standard and of a second pass encoding in the context of the H.264 standard, may naturally be extended to other types of encoding and in particular to hybrid type encodings combining:
 an encoding by transform on blocks of fixed or adaptive size, to remove the spatial redundancies,
 motion-compensated predictions, to remove the time-related redundancies,
 And possessing the same types of images, that is:
 intra (I) images, using the first of the two encodings mentioned above (spatial encoding),
 predicted (P) images, using the two spatial and time-related encodings, with predictions relative to reference images situated exclusively in the past,
 bi-predicted (B) images, using the two spatial and time-related encodings, with predictions relative to reference images situated in the past and in the future.

The invention claimed is:

1. A device for double pass encoding of a video data stream comprising:
 a first type encoding means performing the first encoding pass,
 a second type encoding means different from the first type encoding means performing the second encoding pass using encoding information originating from the first encoding pass,
 means of regulating the bit rate of the data stream originating from the second pass encoding means comprising:
  prediction means which compute a relative weight of the image to be encoded in the reference period,
  regulation means which compute a target cost of the image to be encoded by the second type encoding means on the basis of
   a target bit rate received from the second type encoding means and
   the relative weight of the image to be encoded in the reference period,
  means of quantizing second type encoding which compute the quantization step to be applied to each image to be encoded by the second type encoding means on the basis of the target cost of the image and wherein the prediction means comprise:
   computing a ratio, known as non-reducible cost ratio, of the non-reducible encoding cost of the first pass over the non-reducible encoding cost of the second pass for each image to be encoded,
   computing a ratio, known as complexity ratio, of the complexity of first pass encoding over the complexity of second pass encoding for each image to be encoded,
   updating a complexity ratio averaged on the basis of the complexity ratio of the last images encoded and
   updating a non-reducible cost ratio averaged on the basis of the non-reducible cost ratio of the last images encoded,
   estimating the complexity of the current image to be encoded by the second type encoding means on the basis of the averaged complexity ratio and of the complexity of second type encoding of the said image,
   estimating the non-reducible cost of the current image to be encoded by the second type encoding means on the basis of the ratio of averaged non-reducible cost and the non-reducible cost of first type encoding of the said image,
   estimating the non-reducible cost of the reference period to which the current image belongs,
   computing the complexity of the reference period to which the current image belongs,
   computing the relative weight of the current image as being the ratio between the complexity of the current image and the total complexity of the reference period to which the current image belongs.

2. The encoding device as claimed in claim 1 wherein
the first type encoding means comprise:
   means of measuring the encoding costs of the first pass for each image of the video stream to be encoded,
   means of memorizing the encoding costs of the first encoding pass of several images defining a reference period,
the second type encoding means comprise:
   means of measuring the encoding costs of the second pass for each image of the video stream to be encoded,
   means of memorizing the encoding costs of the second encoding pass of several images defining a reference period.

3. The device as claimed in claim 1 wherein
the encoding costs of the first pass and of the second pass comprise at least for each image to be encoded and for each reference period:
   a reducible cost,
   a non-reducible cost,
and the encoding means of the first pass and of the second pass compute for each image to be encoded the complexity of encoding as being the product of the reducible cost times the quantization step.

4. The device as claimed in claim 1 wherein it comprises means of quantization of first pass encoding computing a quantization step on the basis of the target bit rate received from the second pass encoding means.

5. The device as claimed in claim 1 wherein the first type encoding means comprise means of estimating motion of the video data intended to supply motion vectors to the second type encoding means.

6. The device as claimed in claim 1 wherein the first type encoding means comprise preanalysis means intended to supply to the second type encoding means information concerning the structure of the reference periods, the type of images forming the video data, information on detection of change of scene.

7. The device as claimed in claim 1 wherein the first pass encoding means encode the image in accordance with the MPEG-2 standard and the second pass encoding means encode the image in accordance with the H.264 standard.

8. Method of double pass encoding of a video stream comprising:
   encoding according to a first type performing the first encoding pass,
   encoding according to a second type different from the first type encoding performing the second encoding pass using encoding information originating from the first encoding pass,
   regulating the bit rate of the data stream originating from the second pass encoding means, said regulating the bit rate comprising:
      computing a relative weight of the image to be encoded in the reference period,
      computing a target cost of the image to be encoded according to the second type encoding on the basis of
      a target bit rate and
      the relative weight of the image to be encoded in the reference period,
      computing the quantization step to be applied to each image to be encoded according to the second type encoding on the basis of the target cost of the image
   and wherein the step of computing the relative weight comprises:
      computing a ratio, known as non-reducible cost ratio, of the non-reducible encoding cost of the first pass over the non-reducible encoding cost of the second pass for each image to be encoded,
      computing a ratio, known as complexity ratio, of the complexity of first pass encoding over the complexity of second pass encoding for each image to be encoded,
      updating a complexity ratio averaged on the basis of the complexity ratio of the last images encoded and
      updating a non-reducible cost ratio averaged on the basis of the non-reducible cost ratio of the last images encoded,
      estimating the complexity of the current image to be encoded by the second type encoding means on the basis of the averaged complexity ratio and of the complexity of second type encoding of the said image,
      estimating the non-reducible cost of the current image to be encoded by the second type encoding means on the basis of the ratio of averaged non-reducible cost and the non-reducible cost of first type encoding of the said image,
      computing the non-reducible cost of the reference period to which the current image belongs,
      computing the complexity of the reference period to which the current image belongs,
      computing the relative weight of the current image as being the ratio between the complexity of the current image and the total complexity of the reference period to which the current image belongs.

9. Computer program product embodied on a non-transitory computer readable storage medium within a computer, for double pass encoding of a video data stream in accordance with the method as claimed in claim 8.

* * * * *